United States Patent
Deyle

(10) Patent No.: US 9,602,191 B2
(45) Date of Patent: Mar. 21, 2017

(54) STREAMING DISPLAY DATA FROM A MOBILE DEVICE USING BACKSCATTER COMMUNICATIONS

(71) Applicant: Google Inc., Mountain View, CA (US)

(72) Inventor: Travis Deyle, San Jose, CA (US)

(73) Assignee: X Development LLC, Mountain View, CA (US)

( * ) Notice: Subject to any disclaimer, the term of this patent is extended or adjusted under 35 U.S.C. 154(b) by 183 days.

(21) Appl. No.: 14/317,735

(22) Filed: Jun. 27, 2014

(65) Prior Publication Data

US 2015/0381269 A1 Dec. 31, 2015

(51) Int. Cl.
*H04B 7/00* (2006.01)
*H04B 7/22* (2006.01)
*H04B 7/26* (2006.01)

(52) U.S. Cl.
CPC .............. *H04B 7/22* (2013.01); *H04B 7/26* (2013.01)

(58) Field of Classification Search
CPC .. H04B 5/0031; H04B 5/0037; H04B 5/0056; H04B 7/22; H04B 7/26
USPC ........................................................ 455/41.2
See application file for complete search history.

(56) References Cited

U.S. PATENT DOCUMENTS

| | | | |
|---|---|---|---|
| 7,119,738 B2 * | 10/2006 | Bridgelall | G01S 13/32 340/572.1 |
| 7,657,227 B2 | 2/2010 | Doan et al. | |
| 8,528,825 B2 | 9/2013 | Batra | |
| 8,583,054 B2 * | 11/2013 | Gao | H04W 52/241 455/41.2 |
| 2005/0190098 A1 * | 9/2005 | Bridgelall | G01S 13/32 342/118 |
| 2010/0231382 A1 * | 9/2010 | Tayrani | G01D 21/00 340/539.27 |
| 2011/0275391 A1 | 11/2011 | Lee et al. | |
| 2012/0164961 A1 * | 6/2012 | Gao | H04W 52/241 455/127.1 |
| 2013/0027315 A1 | 1/2013 | Teng | |
| 2013/0147686 A1 | 6/2013 | Clavin et al. | |
| 2014/0016719 A1 | 1/2014 | Manku | |
| 2014/0026068 A1 * | 1/2014 | Park | G06F 3/0482 715/748 |
| 2014/0109161 A1 | 4/2014 | Chang et al. | |
| 2015/0236841 A1 * | 8/2015 | Smida | H04L 27/00 370/278 |

OTHER PUBLICATIONS

PCT/US2015/031929—International Search Report and Written Opinion, mailed Sep. 4, 2015, 10 pages.

(Continued)

*Primary Examiner* — Ajibola Akinyemi
(74) *Attorney, Agent, or Firm* — Blakely Sokoloff Taylor & Zafman LLP

(57) ABSTRACT

A method of wirelessly communicating a screen image between a mobile device and a base station coupled to a display terminal includes establishing a wireless display session between the mobile device and the base station. Electromagnetic ("EM") radiation emitted from the base station is incident upon an antenna of the mobile device. The screen image is transmitted to the base station for display on the display terminal by modulating a radar cross-section of the mobile device between two or more states to encode the screen image on a backscatter channel of the EM radiation.

29 Claims, 6 Drawing Sheets

(56) References Cited

OTHER PUBLICATIONS

Liu, V. et al., "Ambient Backscatter: Wireless Communication Out of Thin Air", University of Washington, http://abc.cs.washington.edu/files/comm153-liu.pdf, Last accessed Jun. 27, 2014, 13 pages.
Thomas, S. et al., "QAM Backscatter for Passive UHF RFID Tags", 4th IEEE International Conference on RFID (RFID), 2010, 5 pages.
Thomas, S. et al., A 96 Mbit/sec, 15.5 pJ/bit 16-QAM Modulator for UHF Backscatter Communication: 6th IEEE International Conference on RFID (RFID), 2012, 6 pages.
Thomas, S. et al., "Quadrature Amplitude Modulated Backscatter in Passive and Semi-Passive UHF RFID Systems", IEEE Transactions on Microwave Theory and Techniques, 2012, 8 pages.
Thomas, S. et al., "Rich-Media Tags: Battery-Free Wireless Multichannel Digital Audio and Image Transmission with UHF RFID Techniques", 7th IEEE International Conference on RFID (RFID), 2013, 6 pages.
Besnoff, J.S. et al., "Battery-Free Multichannel Digital ECG Biotelemetry using UHF RFID Techniques", 7th IEEE International Conference on RFID (RFID), 2013, 7 pages.
Thomas, S., "Modulated Backscatter for Low-Power High-Bandwidth Communication", Department of Electrical and Computer Engineering Duke University, May 2013, 208 pages.
Sample, A.P. et al. "Design of an RFID-Based Battery-Free Programmable Sensing Platform", IEEE Transactions on Instrumentation and Measurement, vol. 57, No. 11, Nov. 2008, 8 pages.
Miller, G., "Scientists Put Backpacks on Dragonflies to Track Their Brains in Flight", Wired Magazine, Jun. 2013, http://www.wired.com/2013/06/dragonfly-backpack-neuron/, 3 pages.
Thomas, S. et al., "QAM Backscatter for Passive UHF RFID Tags", 4th IEEE International Conference on RFID (RFID), Apr. 2010, 5 pages.
Thomas, S. et al., "A 96 Mbit/sec, 15.5 pJ/bit 16-QAM Modulator for UHF Backscatter Communication", 6th IEEE International Conference on RFID (RFID), Apr. 2012, 6 pages.
Thomas, S. et al., "Quadrature Amplitude Modulated Backscatter in Passive and Semi-Passive UHF RFID Systems", IEEE Transactions on Microwave Theory and Techniques, vol. 60, Issue 4, Apr. 2012, 8 pages.
Thomas, S. et al., "Rich-Media Tags: Battery-Free Wireless Multichannel Digital Audio and Image Transmission with UHF RFID Techniques", 7th IEEE International Conference on RFID (RFID), Apr. 30, 2013, 6 pages.
Besnoff, J.S. et al., "Battery-Free Multichannel Digital ECG Biotelemetry using UHF RFID Techniques", 7th IEEE International Conference on RFID (RFID), Date of Conference: Apr. 30, 2013-May 2, 2013, 7 pages.
PCT/US2015/031929—International Preliminary Report on Patentability, mailed Jan. 5, 2017, 7 pages.

* cited by examiner

STREAMING DISPLAY DATA FROM A MOBILE DEVICE USING BACKSCATTER COMMUNICATIONS

TECHNICAL FIELD

This disclosure relates generally to screen sharing and remote displays, and in particular, relates to screen sharing and remote displays for mobile devices.

BACKGROUND INFORMATION

Mobile devices typically have small screens to match their compact form factors. These small screens are not amenable to sharing screen images with large audiences and are often too small to efficiently serve as a primary virtual desktop to execute word processing applications, spreadsheet applications, or the like. Display screen of smartphones have been trending larger, which negatively impacts battery life, is contrary to providing a compact form factor; however, these larger screens are still insufficiently large to perform many tasks in an efficient manner.

Currently, the only realistic way to stream display data off a mobile device is via a wired connection, a WiFi radio, or a Bluetooth radio. The wired connection frustrates the portability feature of a mobile device, while WiFi and Bluetooth radios are inherently power hungry, thereby limiting the duration of their use. These techniques are poor solutions for battery-constrained mobile devices, if the display data is streamed for prolonged periods of time.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and methods of operation for wirelessly streaming display data from a mobile device to a remote display terminal using backscatter communications are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
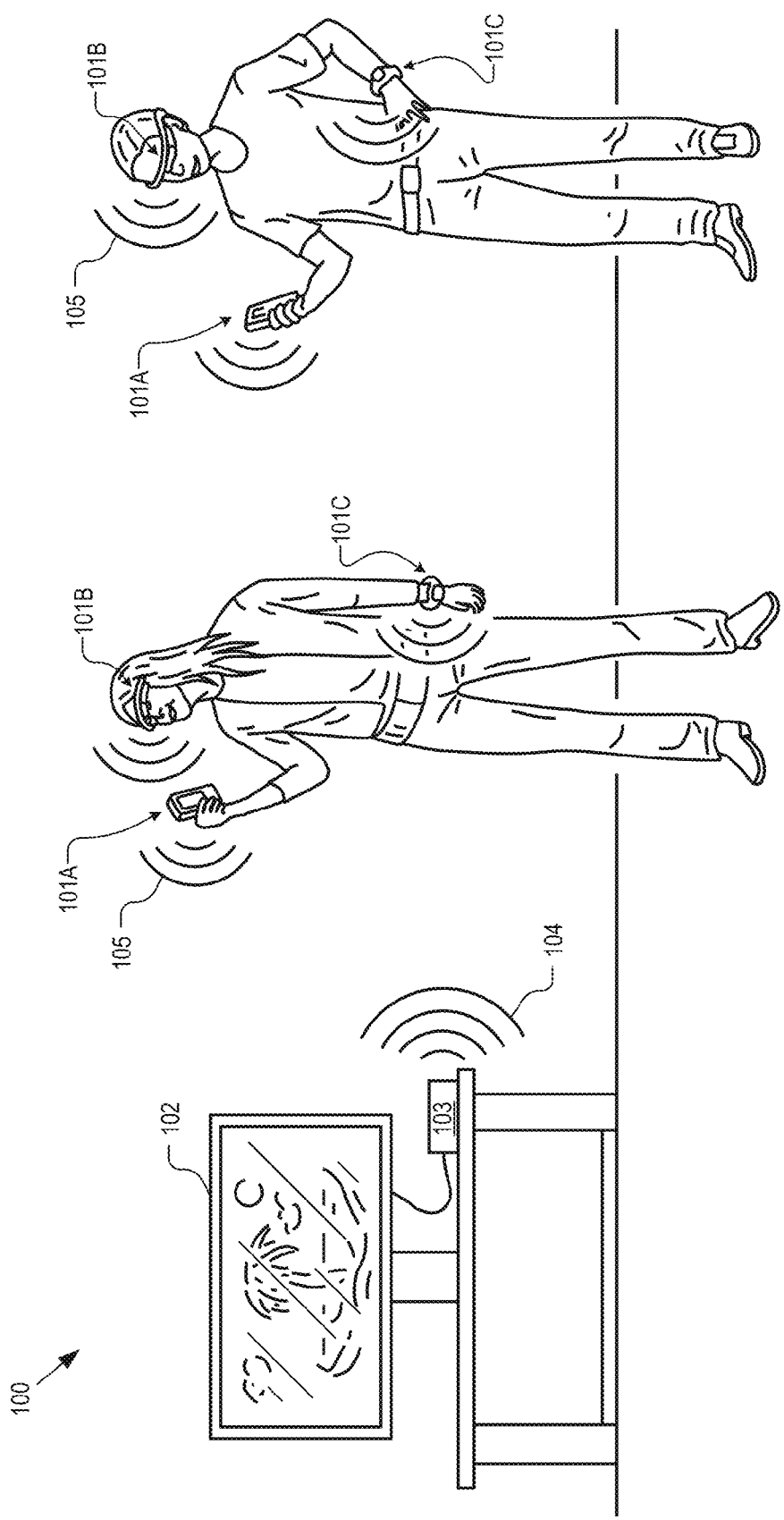
FIG. 1 illustrates an environment for streaming display data from mobile devices to a display terminal, in accordance with an embodiment of the disclosure.

FIG. 1 illustrates an environment 100 for streaming display data from one or more mobile devices 101 to a display terminal 102 via a base station 103, in accordance with an embodiment of the disclosure. Environment 100 uses backscatter communications to provide a short range (e.g., up to 20 m), high bandwidth (e.g., 20 to 100 Mbps), and low power (e.g., less than 1 mW) wireless communication link to deliver screen images from mobile devices 101 to base station 103 for viewing on display terminal 102.

The backscatter communication link is achieved by integrating backscatter tags (e.g., semi-passive RFID tags) into mobile devices 101. The design leverages asymmetric power budgets between wired base station 103 and mobile devices 101 to provide a low power solution on the mobile device side by relying upon the readily available power on the base station side.

Base station 103 includes one or more antennas that broadcast electromagnetic ("EM") radiation 104 towards mobile devices 101 and receive modulated backscatter reflections 105 of EM radiation 104. Modulated backscatter reflections 105 are referred to as the backscatter signal or backscatter channel. The backscatter tags integrated into mobile devices 101 do not transmit any RF or microwave power. Rather, they operate by modulating the reflections of EM radiation 104. The backscatter reflections are encoded with the screen image signal by modulating the radar signatures or radar cross section of mobile devices 101 with image data streams and base station 103 demodulates the received radar signatures reflected from mobile devices 101 to extract the embedded display data. One technique for modulating the radar cross section of mobile devices 101 is to modulate an impedance load coupled to the backscatter antenna on mobile device 101. This impedance modulation is a low power task when compared to an active transmitter such as WiFi or Bluetooth radio. Since the backscatter tags are not actively transmitting, they are substantially unregulated, which makes them appealing in terms of changing technologies and are inherently backwards compatible as new standards or technologies arise. Most of the intelligence for operation of the backscatter channel can be embedded either in software on mobile devices 101 or in base station 103 and thus readily updateable.

Conventional RFID tags are fully passive devices that include no independent power source and harvest their energy for operation from EM radiation 104. However, energy harvesting from EM radiation 104 effectively slows the data rate of the backscatter channel, since the backscatter antenna will typically be optimized for harvesting power, not improving the signal-to-noise ratio ("SNR") of the backscatter channel. Additionally, fully passive RFID tags often pause for periodic power harvesting, which interrupts or delays data transmission. Energy harvesting reduces the read range for base station 103 because more incident EM radiation 104 is required to power up a backscatter tag than is required for the backscatter communications alone. Conventional fully passive backscatter tags employ slower data rates, as energy consumption on the backscatter tag is highly dependent on clock speed.

Embodiments of the backscatter tags embedded within mobile devices 101 are partially passive devices, which do not harvest energy from EM radiation 104. Rather, the backscatter tags are powered by the main battery of mobile devices 101. Since modulating the impedance load requires a modest power budget (e.g., 15 uW), the backscatter transmission does not impact battery life in a significant manner. In fact, in many cases, it will consume less energy to wirelessly stream a screen image off mobile devices 101 to display terminal 102, then powering the on-board display screens of mobile devices 101. Additionally, by not harvesting power from EM radiation 104, the backscatter antennas and modulation load impedances can be optimized for reflecting EM radiation 104 to improve SNR, reduce bit rate errors, and increase data throughput of the backscatter channel. By not harvesting power from EM radiation 104 to power the backscatter tag, embodiments disclosed herein can operate with higher clock rates and greater data throughput.

EM radiation 104 may be broadcast using a variety of different carrier frequencies. For example, EM radiation 104 may operate on unencumbered frequencies such as 915 MHz, 2.45 GHz, 5.8 GHz, and 61.25 GHz. The backscatter tags may modulate the backscatter signal using a variety of techniques and symbol constellations for encoding the screen image signal onto the backscatter channel. For example, binary phase shift keying ("BPSK") or binary amplitude shift keying ("BASK") may be used. To achieve higher data rates, quadrature amplitude modulation ("QAM") may be used to modulate the load impedances applied to the backscatter antenna. Using higher carrier frequencies and larger QAM constellations (e.g., 16-QAM, 64-QAM, etc.) can achieve higher data rates (e.g, 100 Mbps). In some embodiments, the symbol constellation for encoding the screen image on the backscatter channel can be adaptively updated based upon the environment (e.g., noise, multi-path reflections, etc.) to improve throughput, improve SNR, or make the backscatter link less susceptible to degradation as a mobile device 101 moves through the environment.

Mobile devices 101 represent a variety of different devices, including mobile phones 101A, head wearable displays 101B, smart wrist watches 101C, tablets, laptops, body-mountable devices, body implantables, or other mobile devices operating with limited power budgets. Embodiments disclosed herein provide a backscatter channel having sufficient bandwidth to wirelessly stream a screen image, such as a video stream, virtual desktop, or otherwise, from the mobile devices 101 for viewing on display terminal 102. Display terminal 102 may represent a television in a user's home, a projection screen in a conference room, a computer monitor, or otherwise. In the illustrated embodiment, base station 103 is a standalone box that outputs the screen image to display terminal 102 using a standardized video cable (e.g., HDMI cable, VGA connector, S-video cable, composite video cable, component video cable, etc.). In other embodiments, base station 103 may be integrated into display terminal 102 or set-top box.

Figure 2:
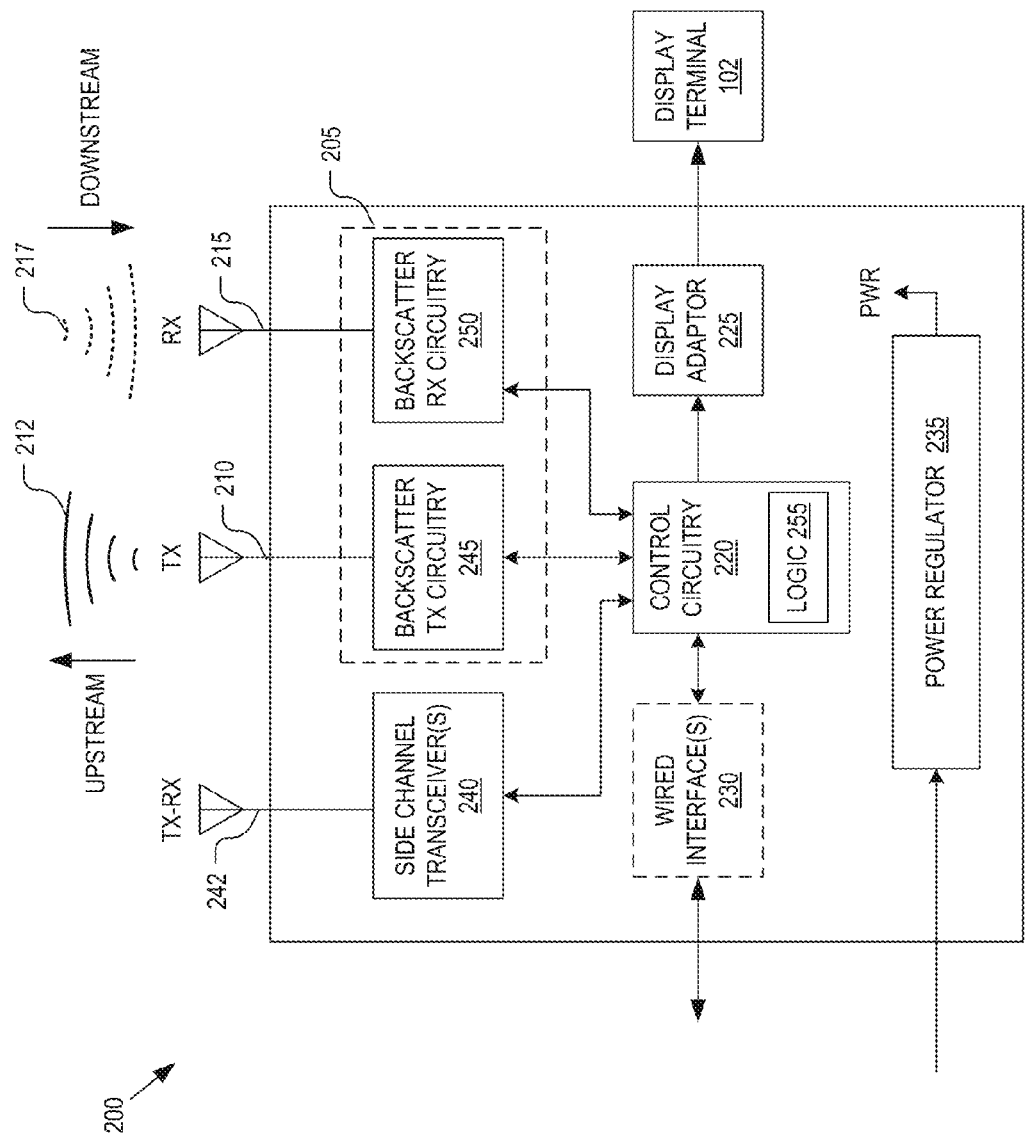
FIG. 2 is a functional block diagram illustrating a base station for wirelessly streaming display data from a mobile device to a display terminal, in accordance with an embodiment of the disclosure.

FIG. 2 is a functional block diagram illustrating a base station 200 for wirelessly streaming display data from a mobile device to a display terminal, in accordance with an embodiment of the disclosure. Base station 200 is one possible implementation of base station 103 illustrated in FIG. 1. The illustrated embodiment of base station 200 includes a backscatter transceiver 205, backscatter antennas 210 and 215, control circuitry 220, a display adaptor 225, wired interface(s) 230, a power regulator 235, side channel transceiver(s) 240, and one or more side channel antenna(s) 242. The illustrated embodiment of backscatter transceiver 205 includes backscatter transmit circuitry 245 and backscatter receive circuitry 250. The illustrated embodiment of control circuitry 220 includes logic 255. FIG. 2 illustrates functional components of base station 200 and not necessarily structural layout. It should be appreciated that the various components of base station 200 may be implemented entirely in hardware, entirely in software/firmware, or using a hybrid of both software/firmware and hardware.

Backscatter transceiver 205 is the primary communication channel for delivering high bandwidth display data streams from mobile devices 101 to base station 200. In one embodiment, the upstream direction from backscatter transmit circuitry 245 is a non-communicative path, but merely outputs EM radiation 212 as a sort of radar signal. In other embodiments, backscatter transmit circuitry 245 can modulate data onto EM radiation 212 to provide an upstream broadcast data path to mobile devices 101. Backscatter transmit circuitry 245 can output EM radiation 212 having a variety of different frequencies such as 915 MHz, 2.45 GHz, 5.8 GHz, 61.25 GHz, or otherwise. Backscatter receive circuitry 250 implements the downstream path from mobile devices 101 and operates by demodulating the backscatter signal reflected by mobile devices 101. In essence, backscatter receive circuitry 250 is demodulating the received radar signature reflected from mobile devices 101. The radar signature or backscatter signal may be modulated using a variety of different techniques and symbol constellations including, BPSK, BASK, QAM or otherwise. As such, backscatter receive circuitry 250 includes the requisite filters, mixers, amplifiers, decoders, framers, and the like to demodulate/decode the appropriate modulation scheme. Although FIG. 2 illustrates separate transmit and receive antennas, in other embodiments, a single backscatter antenna may be used to both transmit EM radiation 212 and receive the backscatter signal 217. In other embodiment, multiple transmit and receive antennas may be used along with beam forming and tracking techniques.

Side channel transceiver(s) 240 represent one or more wireless communication channels that do not use backscatter communications. For example, side channel transceiver(s) 240 may be implemented using a WiFi transceiver, a Bluetooth transceiver, an infrared transceiver, or other standardized/proprietary wireless communication systems. Side channel transceiver 240 facilitates out-of-band communications with mobile devices 101. To conserve power, side channel transceiver 240 is well-suited for low bandwidth control signaling with mobile devices 101 to setup, teardown, or otherwise manage wireless display sessions with mobile devices 101. The side channel transceiver 240 may also provide a network connection to the Internet or other consumer products (e.g., network attached storage, etc.) for base station 200.

Wired interface(s) 230 may include any number of wired communication ports. For example, wired interfaces 230 may include an Ethernet controller, a universal serial bus ("USB") port, or otherwise. The Ethernet controller may provide a network connection as well.

Display adaptor 225 includes a video adaptor circuitry for outputting screen images to display terminal 102. The output port of display adaptor 225 may include an HDMI cable, a VGA connector, a S-video cable, a composite video cable, component video cable, or otherwise.

Power regulator 235 provides a wired power connection for powering the internal components of base station 200. Since base station 235 is a wired device, it is not constrained by a limited power budget like mobile devices 101. Backscatter communications leverage this asymmetric power budget by pushing the power hungry generation of EM radiation 212 into base station 200 while mobile device 101 operate by reflecting EM radiation 212 (not independently generating radiation) generated at base station 200.

Control circuitry 220 is the operational brains of base station 200. It includes logic 255 for coordinating the operation of the other functional components and includes a processor for computational executions. Logic 255 may include hardware logic or software/firmware instructions stored on one or more memory devices. For example, logic 255 may include instructions for establishing a wireless display session with one or more mobile devices 101, configuring and managing the wireless display sessions, and terminating the wireless display sessions.

Figure 3:
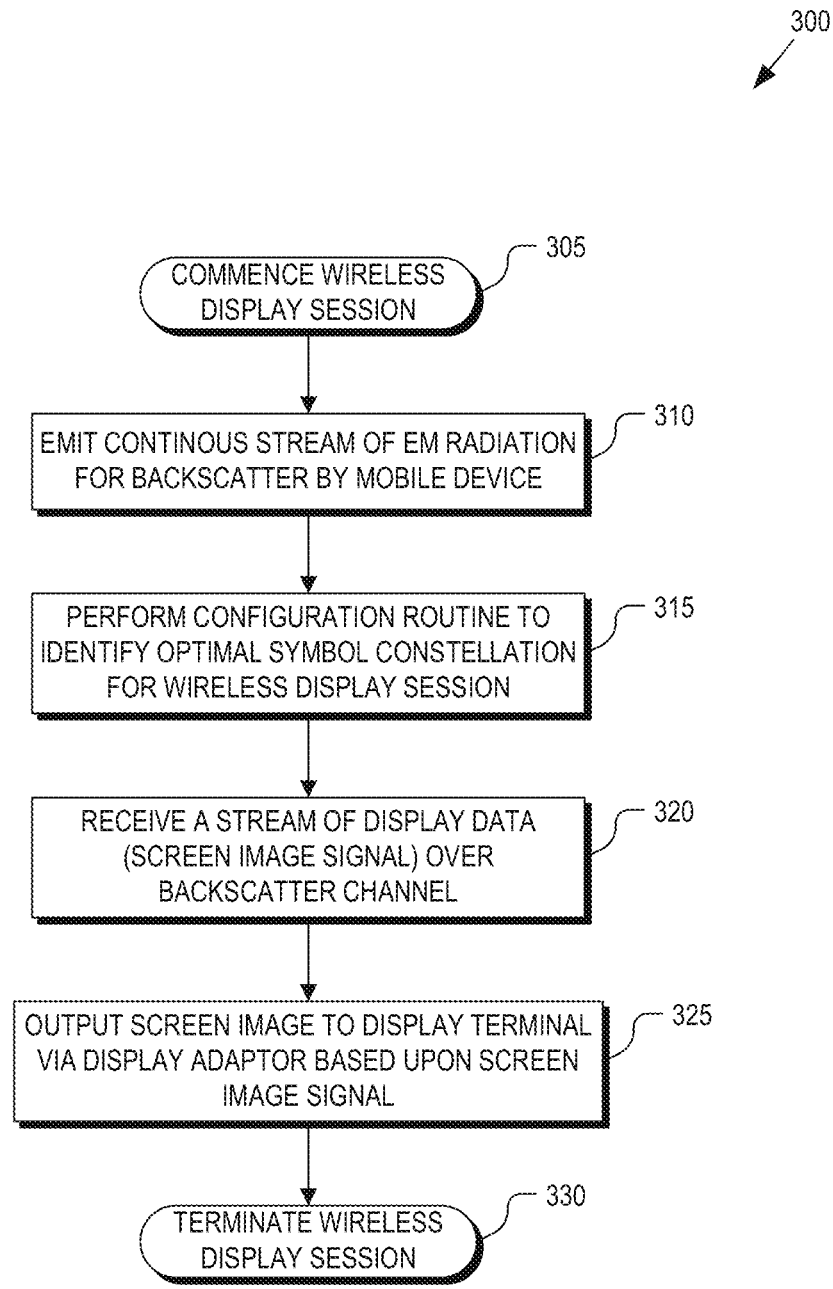
FIG. 3 is a flow chart illustrating base station side processing for wirelessly streaming a screen image from a mobile device to a display terminal, in accordance with an embodiment of the disclosure.

FIG. 3 is a flow chart illustrating a process 300 performed by base station 200 for wirelessly streaming a screen image from mobile devices 101 to display terminal 102, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, a wireless display session is established between base station 200 and one of mobile devices 101. In one embodiment, base station 200 may periodically emit a beacon pulse of EM radiation 212 to alert mobile devices 101 of its presence. Subsequently, the control signaling to establish a given wireless display session may be conveyed over an out-of-band side channel using side channel transceivers 240. In other embodiments, the control signal may be partially or entirely in-band over the backscatter channel. Establishing a wireless display session may include one or more of assigning a session reference number, determining display privileges for the mobile device 101, allocating memory for the streaming display data, establishing a timeshare allocation, exchanging cryptographic keys, etc.

Once the wireless display session has been commenced, base station 200 commences emitting a continuous stream of EM radiation 212 for modulation and backscatter by the mobile device (process block 310). In a timesharing embodiment, the continuous stream of EM radiation 212 may be continuous for fixed periods of time.

In a process block 315, base station 200 may perform a configuration routine in cooperation with the mobile device to identify an optimal symbol constellation for encoding the backscatter channel during the wireless display session. This configuration routine may be part of establishing the wireless display session. For example, the mobile device may encode a configuration data set with a series of different symbols while base station 200 analyzes the signal quality associated with the various different symbols. This configuration routine may continue until base station 200 identifies a preferred symbol constellation that maximize SNR or data throughput. The identified symbol constellation may then be used for the remainder of the wireless display session, for a fixed period of time when the configuration routine is automatically re-executed, or until the signal quality drops below a threshold (e.g., threshold bit error rate). In one embodiment, the configuration routine is executed in cooperation with the side channel signaling to facilitate the processes. Execution of the configuration routine to dynamically select a symbol constellation for encoding data over the backscatter channel is optional. A fixed symbol constellation may also be used.

Once the wireless display session has been established, base station 200 can commence receiving streaming display data (e.g., a screen image) over the backscatter channel via backscatter signal 217 from a mobile device (process block 320). If the screen image is uncompressed, it can be sent directly to display adaptor 225 for display on display terminal 102 (process block 325). If the screen image is compressed, control circuitry 220 may include a decoder for uncompressing the display data prior to forwarding it to display adaptor 225 (process block 325).

Once receipt of display data has completed, base station 200 ceases the continuous output of EM radiation 212 and the wireless display session is terminated (process block 330). In one embodiment, control signaling for terminating the wireless display session may be executed out-of-band over side channels (e.g., Bluetooth or WiFi), or using a special in-band termination sequence that is recognized by base station 200.

Figure 4:
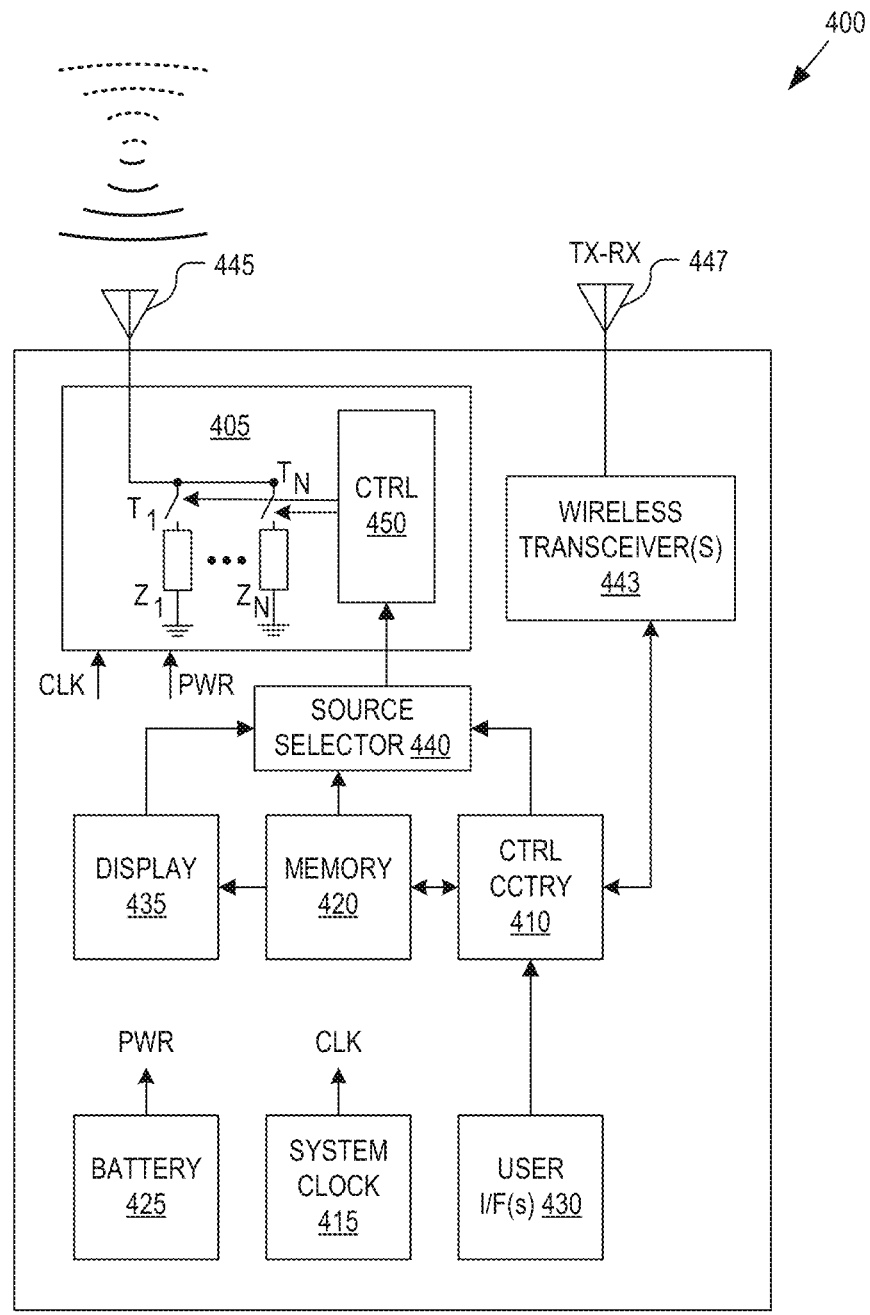
FIG. 4 is a functional block diagram illustrating a mobile device including a backscatter tag for wirelessly streaming display data to a base station for display on a display terminal, in accordance with an embodiment of the disclosure.

FIG. 4 is a functional block diagram illustrating a mobile device 400 including a backscatter tag 405 for wirelessly streaming display data to base station 103 for display on display terminal 102, in accordance with an embodiment of the disclosure. Mobile device 400 is one possible implementation of one of mobile devices 101 and may represent at mobile phone, a head wearable display, a wrist watch, a tablet, a laptop, or otherwise. The illustrated embodiment of mobile device 400 includes backscatter tag 405, control circuitry 410, a system clock 415, memory 420, a battery 425, user interface(s) 430, a display 435, a source selector 440, wireless transceiver(s) 443, a backscatter antenna 445, and wireless antenna(s) 447. The illustrated embodiment of backscatter tag 405 includes load impedances Z1 to ZN and a backscatter controller 450.

Backscatter tag 405 is the primary communication channel for delivering high bandwidth display data streams from mobile device 400 to base station 103. Backscatter tag 405 is a relatively inexpensive and small item that can be integrated into mobile devices 101. Backscatter tag 405 operates by modulating the radar cross-section of backscatter antenna 445 by modulating the impedance of antenna 445. In the illustrated embodiment, backscatter tag 405 modulates the impedance of antenna 445 by selectively coupling (e.g., via switches T1 to TN) load impedances Z1 to ZN to backscatter antenna 445 under the influence of backscatter controller 450. This switching of the load impedances is a relative small power operation and backscatter tag 405 does not generate any EM radiation of its own. Backscatter controller 450 operates by receiving a data stream input from source selector 440 (e.g., screen image), and using the data stream input to modulate the impedance of backscatter antenna 445. Various other techniques for modulating the radar cross section of mobile device 400 may also be implemented. For example, one or more variable impedance transistors may be coupled to backscatter antenna 445, diodes may be coupled to backscatter antenna 445 and their bias adjusted, or otherwise. In most cases modulating the impedance of backscatter antenna 445 to convey a screen image consumes significantly less power than displaying the same screen image on display 435 of mobile device 400.

Wireless transceiver(s) 443 represent one or more wireless communication channels that do not use backscatter communications. For example, side wireless transceiver(s) 443 may be implemented using a WiFi transceiver, a Bluetooth transceiver, an infrared transceiver, a cellular transceiver, or other standardized/proprietary wireless communication systems. Wireless transceiver 443 facilitates out-of-band communications with base station 103. To conserve power, wireless transceiver(s) 443 are well-suited for low bandwidth control signaling with base station 103 to setup, teardown, or otherwise manage wireless display sessions with mobile device 400. The wireless transceiver(s) 443 may also provide a network connection to the Internet or other consumer products (e.g., network attached storage, etc.).

Mobile device 400 includes a variety of other functional elements for the regular operation of mobile device 400. These include control circuitry 410 (e.g., micro-processor), memory 420 (e.g., RAM and ROM), user interfaces 430 (e.g., a touch screen, mechanical buttons, capacitive sense buttons, etc.), and a display 435. Mobile device 400 includes a system clock 415 for synchronous operations and a battery 425 having a limited power budget. Other functional components of typical mobile devices may also be included, but are not illustrated so as not to clutter FIG. 4 and obscure the relevant details.

Control circuitry 410 is the operational brains of mobile device 400. It includes logic for coordinating the operation of the other functional components and includes a processor to perform computational executions. This logic may include hardware logic or software/firmware instructions stored on one or more memory devices. For example, the logic may include instructions for establishing a wireless display session with base station 103, configuring and managing the wireless display sessions, or terminating the wireless display sessions.

In the illustrated embodiment, mobile device 400 includes a source selector 440 for selecting a given source of display data for routing to backscatter tag 405. Source selector 440 may be implemented as a MUX switch that is coupled to control circuitry 410, memory 420, or display 435 as the source of the display data to stream over the backscatter channel to a remote display terminal. Source selector 440 enables uncompressed display data (e.g., screen images) to be accessed via memory 420 (e.g., display memory), accessed directly from a bus of display 435, or output from control circuitry 410.

Figure 5:
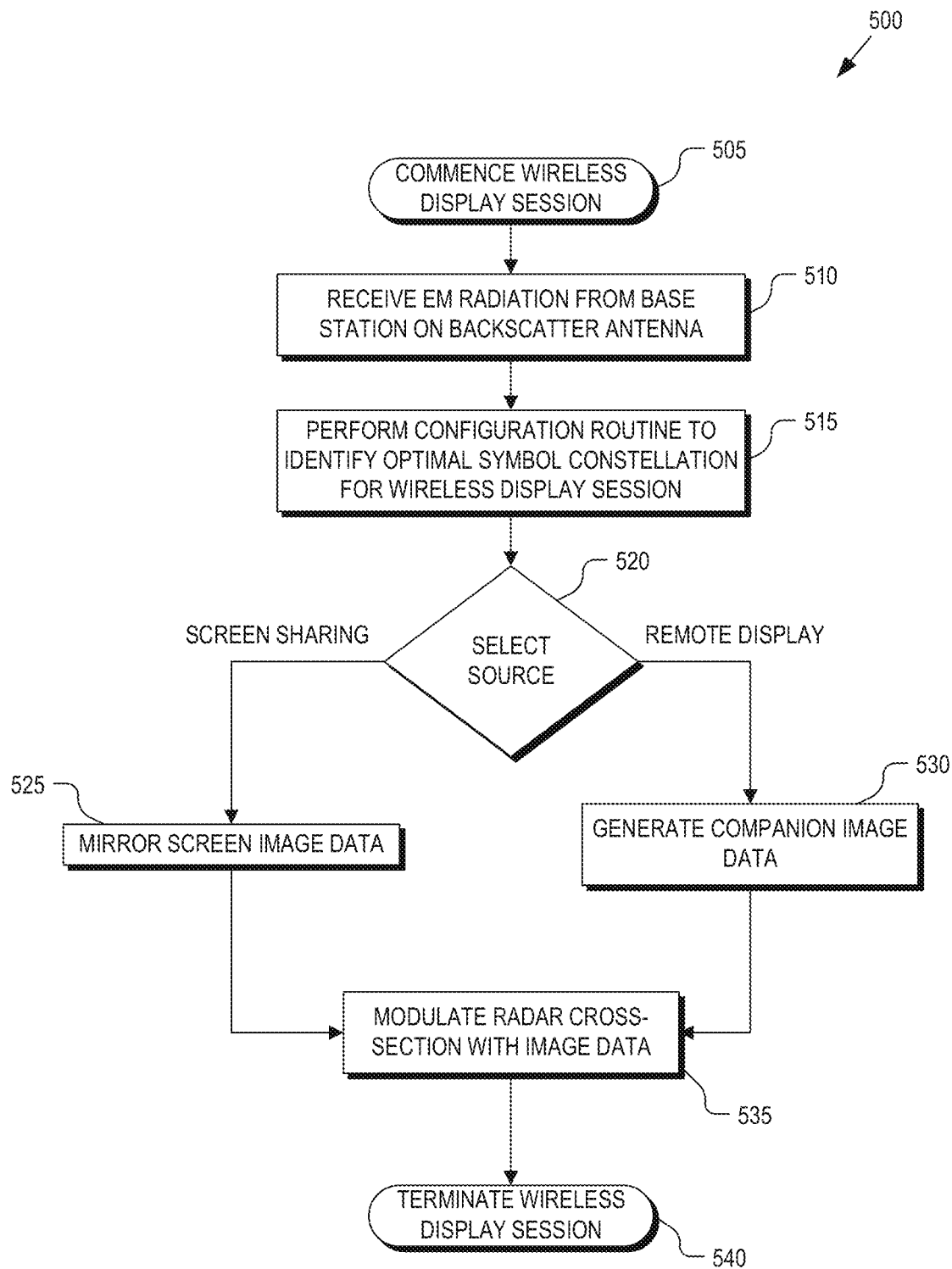
FIG. 5 is a flow chart illustrating mobile side processing for wirelessly streaming a screen image for display on a display terminal, in accordance with an embodiment of the disclosure.

FIG. 5 is a flow chart illustrating a process 500 performed by mobile device 400 for wirelessly streaming a screen image to display terminal 102 via base station 103, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, a wireless display session between mobile device 400 and base station 103 is commenced. In one embodiment, the wireless display session is commenced using side channel control signaling over wireless transceivers 443. In another embodiment, the wireless display session is commenced by modulating a control signal response onto a beacon pulse of EM radiation emitted by base station 103. Establishing a wireless display session may include one or more of providing address information to base station 103, negotiating display privileges with base station 103, negotiating a data rate and screen resolution, establishing a timeshare allocation, exchanging cryptographic keys to prevent eavesdropping, or otherwise.

Once the wireless display session has been commenced, mobile device 400 begins receiving a continuous stream of EM radiation from base station 103 (process block 510). In a timesharing embodiment, the continuous stream of EM radiation may be continuous for fixed periods of time.

In a process block 515, a configuration routine may be performed in cooperation with base station 103 to identify an optimal symbol constellation for encoding the backscatter channel during the wireless display session. This configuration routine may be part of establishing the wireless display session. For example, mobile device 400 may encode a configuration data set with a series of different symbols while base station 103 analyzes the signal quality associated with the various different symbols. This configuration routine may continue until mobile device 400 is notified by base station 103 that a preferred symbol constellation that maximize SNR or data throughput has been identified and conveyed to mobile device 400. The identified symbol constellation may then be used for the remainder of the wireless display session, for a fixed period of time when the configuration routine is automatically re-executed, or until the signal quality drops below a threshold (e.g., threshold bit error rate). In one embodiment, the configuration routine is executed in cooperation with the side channel signaling to facilitate the processes. Execution of the configuration routine to dynamically select a symbol constellation for encoding data over the backscatter channel is optional. A fixed symbol constellation may also be used.

Once the wireless display session has been established, mobile device 400 can select the source of the display data for streaming over the backscatter channel (decision block 520). This decision can have default settings, and/or be user selectable. If the wireless display session is a screen sharing session, then process 500 continues to a process block 525 where a screen image that mirrors the screen image on display 435 is routed by source selector 440 to backscatter tag 405. In one embodiment, this display data is uncompressed data that is acquired from a display bus of display 435 or accessed directly from display memory within memory 420. In either event, display 435 may be disabled to conserve power, or continue to display the screen image as well.

Returning to decision block 520, if the wireless display session is a remote display session, then process 500 continues to a process block 530 where a companion image that is distinct from the a primary image being displayed on display 435 is generated. The companion image may be routed directly from control circuitry 410 to backscatter tag 405 via source selector 440, or generated by control circuitry 410 into memory 420 and routed from memory 420 to backscatter tag 405 via source selector 440. In one embodiment, to conserve power of battery 425, the companion image is not compressed prior to transmission over the backscatter channel.

In process block 535, backscatter tag 405 modulates the radar cross-section of mobile device 400 to encode the screen image onto the backscatter channel. In one embodiment, the radar cross-section of the mobile device 400 is modulated (thereby modulating the radar signature received at the base station) by modulating the impedance load on backscatter antenna 445. Once mobile device 400 has completed transmission of the display data, it signals to base station 103 that the wireless display session is complete (process block 540). In one embodiment, control signaling for terminating the wireless display session may be executed out-of-band over side channels (e.g., Bluetooth or WiFi), or using a special in-band termination sequence that is recognized by base station 103.

Figure 6:
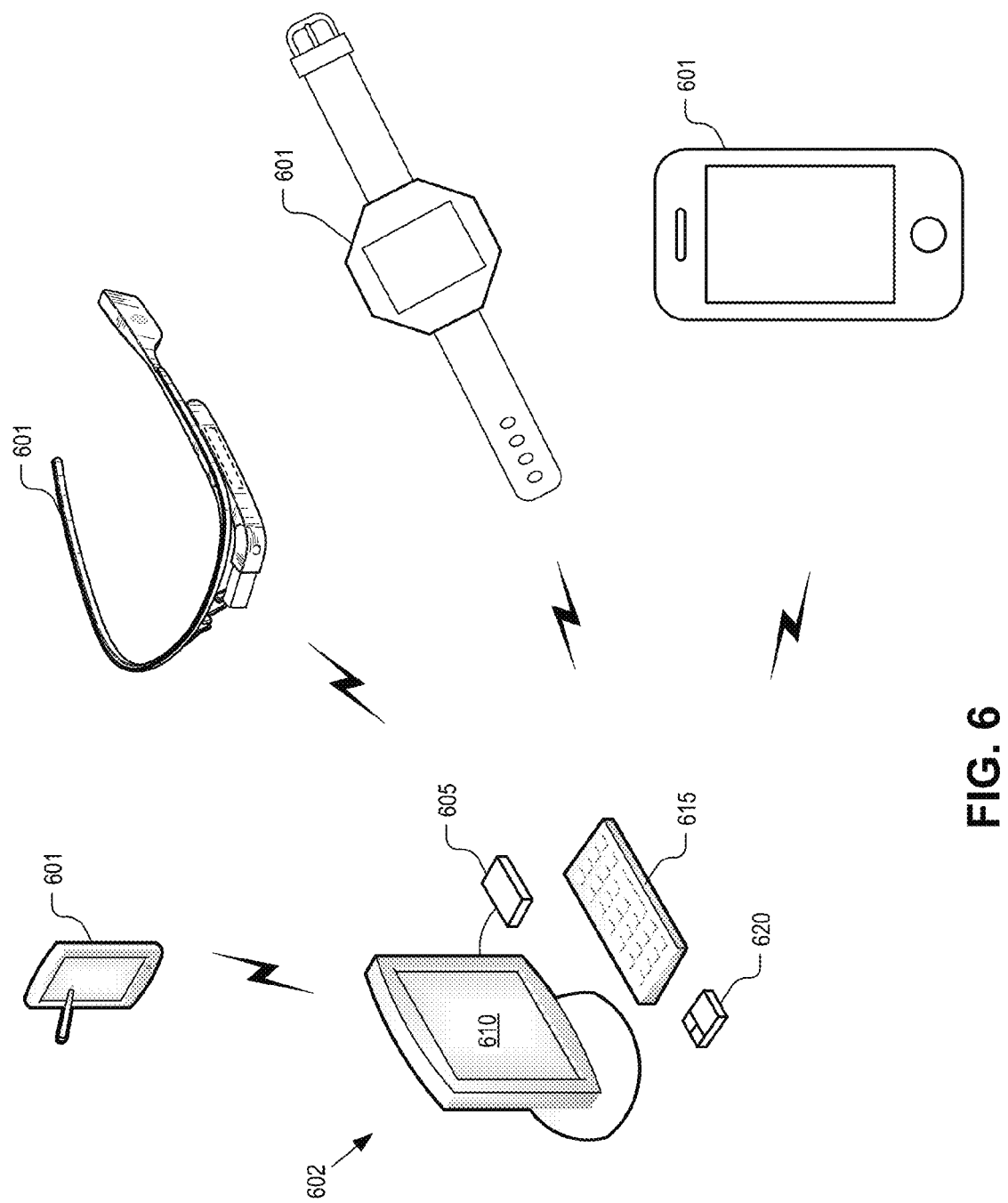
FIG. 6 illustrates how various mobile devices can be used in connection with dumb terminals to provide a portable virtual desktop experience that follows the user, in accordance with an embodiment of the disclosure.

FIG. 6 illustrates how various mobile devices 601 can be used in connection with a dumb terminal 602 to provide a portable virtual desktop experience that follows the user, in accordance with an embodiment of the disclosure. Using the low power, high bandwidth backscatter channel described above, any one of mobile devices 601 can facilitate a portable virtual desktop experience. Many mobile devices have enough processing power and memory to substitute for a desktop computer. As such, a mobile device can become a personal, portable processing unit that wirelessly streams a virtual desktop environment onto a display screen of dumb terminal 602. Dumb terminal 602 includes a base station 605, display terminal 610, a keyboard 615, and a pointer device 620. Using a backscatter channel as described above, mobile devices 601 can stream a virtual desktop to base station 605 for display on display terminal 610. Keyboard 615 and pointer device 620 may be wireless devices (e.g., Bluetooth keyboards) that communicate directly with mobile devices 601 or have wired connections to base station 605, which in turn relays interface instructions from mobile devices 601 via wireless side channels or even via the backscatter channel.

In addition to streaming a mobile virtual desktop, mobile devices 601 can efficiently stream video calls to display terminal 610 using the network connection of the mobile device as the communication link. For example, if a mobile phone receives a video call over its cellular communication link, the backscatter channel can be used to display the inbound video image to display terminal 610. An outbound video image may be captured with a camera of the mobile phone and transmitted over the cellular communication link while the inbound video image is continuously streamed to display terminal 610. Other use case scenarios for the streaming screen images over a backscatter channel of a mobile device to a remote display terminal are envisioned. For example, anyone of mobile devices 601 could stream a screen image to a large screen in a conference room or interactive games on a mobile device could be streamed onto a family room television, to name a couple.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of wirelessly streaming display data, the method comprising:
 establishing a wireless display session between a mobile device and a base station coupled to a display terminal;
 receiving, at the mobile device, electromagnetic ("EM") radiation emitted from the base station and incident upon an antenna of the mobile device; and
 encoding a screen image generated by the mobile device onto a backscatter channel of the EM radiation by modulating an impedance of the antenna of the mobile device between two or more states; and
 transmitting the screen image, for display on the display terminal coupled to the base station, from the mobile device to the base station over the backscatter channel of the EM radiation.

2. The method of claim 1, wherein the mobile device comprises one of a mobile phone, a head wearable display, a wrist watch, a body-mountable device, a body-implantable device, a tablet, or a laptop.

3. The method of claim 1, wherein the wireless display session comprises a screen sharing session for wirelessly mirroring the screen image of the mobile device onto the display terminal.

4. The method of claim 1, wherein the wireless display session comprises a remote display session for wirelessly conveying the screen image from the mobile device onto the display terminal, wherein the screen image is a companion image that is distinct from a primary image being displayed on a screen of the mobile device.

5. The method of claim 1, wherein establishing the wireless display session between the mobile device and the base station comprises conveying session initiation information via a wireless side channel that does not use backscatter of the EM radiation from the base station.

6. The method of claim 5, wherein control signaling for managing the wireless display session is conveyed via the wireless side channel while the screen image is conveyed via the backscatter channel of the EM radiation.

7. The method of claim 1, wherein transmitting the screen image for display on the display terminal from the mobile device to the base station comprises transmitting the screen image without compressing the screen image at the mobile device prior to the transmitting.

8. The method of claim 1, further comprising:
 powering the modulation of the impedance of the antenna of the mobile device using a primary battery of the mobile device.

9. The method of claim 1, wherein the screen image comprises an inbound video image associated with a video call, the method further comprising:

receiving the video call at the mobile device via a communication link of the mobile device that is separate from the backscatter channel; and transmitting the inbound video image to the base station over the backscatter channel for display on the display terminal.

10. The method of claim 1, wherein the screen image comprises a virtual desktop generated by the mobile device in real-time, the method further comprising:

communicating between the mobile device and a keyboard over a wireless side channel that does not use the backscatter channel to provide a keyboard interface with the virtual desktop, wherein communications between the mobile device and the keyboard occur while the virtual desktop is conveyed to the display terminal via the base station over the backscatter channel.

11. The method of claim 1, further comprising:

performing a configuration routine to identify a subset of available impedances that improve a signal-to-noise ratio ("SNR") of the backscatter channel; and using the identified subset of available impedances as a symbol constellation for encoding the screen image on the backscatter channel during the wireless display session.

12. The method of claim 1, further comprising:

selecting a source for the screen image; and coupling the source to a backscatter tag of the mobile device for transmission to the base station via the backscatter channel, wherein the source comprises one of a memory module, a display module, or control circuitry of the mobile device.

13. At least one non-transitory machine-readable storage medium that provides instructions that, when executed by a mobile device, will cause the mobile device to perform operations comprising:

establishing a wireless display session between the mobile device and a base station coupled to a display terminal to receive electromagnetic ("EM") radiation incident upon an antenna of the mobile device from the base station;

modulating a radar cross-section of the mobile device between two or more states;

encoding a screen image generated by the mobile device onto a backscatter channel of the EM radiation via the modulating; and transmitting the screen image from the mobile device to the base station for display on the display terminal.

14. The at least one non-transitory machine-readable storage medium of claim 13, wherein the wireless display session comprises a screen sharing session for wirelessly mirroring the screen image of the mobile device onto the display terminal.

15. The at least one non-transitory machine-readable storage medium of claim 13, wherein the wireless display session comprises a remote display session for wirelessly conveying the screen image from the mobile device onto the display terminal, wherein the screen image is a companion image that is distinct from a primary image being displayed on a screen of the mobile device.

16. The at least one non-transitory machine-readable storage medium of claim 13, wherein control signaling for managing the wireless display session is conveyed via a wireless side channel while the screen image is conveyed via the backscatter channel of the EM radiation.

17. The at least one non-transitory machine-readable storage medium of claim 13, wherein transmitting the screen image for display on the display terminal from the mobile device to the base station comprises transmitting the screen image without compressing the screen image at the mobile device prior to the transmitting.

18. The at least one non-transitory machine-readable storage medium of claim 13, wherein the screen image comprises an inbound video image associated with a video call, the at least one machine-accessible storage medium of claim 1, further providing instructions that, when executed by the mobile device, will cause the mobile device to perform further operations, comprising:

receiving the video call at the mobile device via a communication link of the mobile device that is separate from the backscatter channel; and transmitting the inbound video image to the base station over the backscatter channel for display on the display terminal.

19. The at least one non-transitory machine-readable storage medium of claim 13, further providing instructions that, when executed by the mobile device, will cause the mobile device to perform further operations, comprising:

performing a configuration routine to identify a subset of available radar cross-sections that improve a signal-to-noise ratio ("SNR") of the backscatter channel; and using the identified subset of available radar cross-sections for encoding the screen image on the backscatter channel during the wireless display session.

20. A base station, comprising:

backscatter transceiver circuitry coupled to output electromagnetic ("EM") radiation and to receive a backscatter signal of the EM radiation;

a display adapter; and control circuitry coupled to the backscatter transceiver circuitry and the display adapter, the control circuitry including logic, that, when executed by the control circuitry, will cause the base station to perform operations, comprising:

establish a wireless display session with a mobile device;

output the EM radiation;

perform a configuration routine to identify a subset of available symbols that improve a signal-to-noise ratio ("SNR") of the backscatter signal;

inform the mobile device of the subset of available symbols that improve the SNR of the backscatter signal at the base station so that subsequent communication using the backscatter signal of the EM radiation uses the subset of available symbols as a symbol constellation for encoding a screen image signal on the backscatter signal during the wireless display session;

receive the backscatter signal of the EM radiation carrying the screen image signal encoded onto the backscatter signal from the mobile device; and output a screen image from the display adapter based upon the screen image signal for display on a display terminal.

21. The base station of claim 20, further comprising a side channel transceiver coupled to the control circuitry, wherein the side channel transceiver does not use backscatter of the EM radiation, and wherein establish the wireless display session with the mobile device comprises conveying session initiation information between the mobile device and the base station via the side channel transceiver.

22. The base station of claim 21, wherein the control circuitry includes further logic, that, when executed by the control circuitry, will cause the base station to perform further operations, comprising:

conveying control signaling for managing the wireless display session over the side channel transceiver while the screen image signal is received via the backscatter signal of the EM radiation.

23. The base station of claim 22, wherein the side channel transceiver comprises at least one of a WiFi transceiver or a Bluetooth transceiver.

24. The base station of claim 20, wherein the backscatter transceiver circuitry comprises a quadrature amplitude modulated ("QAM") receiver.

25. The base station of claim 20, wherein the control circuitry includes further logic, that, when executed by the control circuitry, will cause the base station to perform further operations, comprising:

broadcast information to a plurality of mobile devices along an upstream link by modulating the EM radiation.

26. The base station of claim 25, wherein the broadcast information comprises a beacon to notify the mobile devices of a presence of the base station.

27. A method of wirelessly streaming display data, the method comprising:

establishing a wireless display session between a mobile device and a base station coupled to a display terminal;

receiving, at the mobile device, electromagnetic ("EM") radiation emitted from the base station and incident upon an antenna of the mobile device;

receiving a video call at the mobile device via a communication link of the mobile device that is separate from a backscatter channel of the EM radiation;

transmitting a screen image for display on the display terminal from the mobile device to the base station by modulating an impedance of the antenna of the mobile device between two or more states to encode the screen image on the backscatter channel of the EM radiation, wherein the screen image comprises an inbound video image associated with the video call; and transmitting the inbound video image to the base station over the backscatter channel for display on the display terminal.

28. A method of wirelessly streaming display data, the method comprising:

establishing a wireless display session between a mobile device and a base station coupled to a display terminal;

receiving, at the mobile device, electromagnetic ("EM") radiation emitted from the base station and incident upon an antenna of the mobile device;

transmitting a screen image for display on the display terminal from the mobile device to the base station by modulating an impedance of the antenna of the mobile device between two or more states to encode the screen image on a backscatter channel of the EM radiation, wherein the screen image comprises a virtual desktop generated by the mobile device in real-time; and communicating between the mobile device and a keyboard over a wireless side channel that does not use the backscatter channel to provide a keyboard interface with the virtual desktop, wherein communications between the mobile device and the keyboard occur while the virtual desktop is conveyed to the display terminal via the base station over the backscatter channel.

29. At least one non-transitory machine-readable storage medium that provides instructions that, when executed by a mobile device, will cause the mobile device to perform operations comprising:

establishing a wireless display session between the mobile device and a base station coupled to a display terminal to receive electromagnetic ("EM") radiation incident upon an antenna of the mobile device from the base station;

performing a configuration routine to identify a subset of available radar cross-sections that improve a signal-to-noise ratio ("SNR") of a backscatter channel;

modulating a radar cross-section of the mobile device between two or more states;

encoding a screen image onto the backscatter channel of the EM radiation via the modulating, wherein the identified subset of available radar cross-sections are used for the encoding of the screen image onto the backscatter channel during the wireless display session; and transmitting the screen image to the base state for display on the display terminal.

* * * * *